United States Patent Office 2,903,355
Patented Sept. 8, 1959

2,903,355

RUMINANT FEED COMPOSITION CONTAINING AN AMMONIUM SALT

Irvin J. Belasco, Wilmington, Del., assignor to E. I. du Pont de Nemours and Company, Wilmington, Del., a corporation of Delaware No Drawing. Original application November 3, 1951, Serial No. 254,789. Divided and this application October 5, 1955, Serial No. 541,093

3 Claims. (Cl. 99—2)

This invention relates to a new source of nitrogen to supplement the protein feed of Ruminantia, a division of ungulate mammals, with a quadripartite stomach and more especially is directed to providing ammonium salts of organic acids as a source of usable nitrogen to supplement the protein feeds for such animals. This application is a division of my application S.N. 254,789, filed November 3, 1951.

Burroughs et al., of the Ohio Agricultural Experimental Station, have called attention to the importance of nutrients needed by rumen microorganisms in the digestion of roughages and particularly the cellulose fraction of their normal feed. (Jour. Animal Science, 9, 523–530, 1950.) From the fact that the feeding of cattle and other ruminant animals often includes the feeding of grains and protein-rich feeds in combination with roughage, Burroughs has postulated that these grains and protein-rich feeds, when fed with roughage, might supply nutritional factors needed by rumen microorganisms in the digestion of the roughage fraction of the ration (Feedstuffs, p. 24, Dec. 9, 1950). These investigators present considerable evidence supporting the proposition that grains and other protein-rich feeds contribute to the nutrition of rumen microorganisms in their digestion of cellulose.

Further work has established that urea is a source of usable nitrogen which may replace a portion, at least, of the protein feed for such animals. By usable nitrogen is meant the nitrogen of a compound that is a food for rumen microflora. An improved use of compounds derived from urea is described in U.S. Patent 2,687,354 of M. F. Gribbins, issued August 24, 1954. In the use of urea as a source of usable nitrogen, care must be exercised to control carefully the amount of urea available to the animal. It has been found that urea and its derivatives can be used to supply ¼ to ⅔ and preferably about ⅓ of the protein requirements. Inasmuch as, however, large quantities of urea per se under certain conditions is broken down by microorganisms and amidases present in the rumen of certain animals, giving free ammonia, care must be exercised to prevent excess formation of the ammonia compounds in toxic concentrations. (J. S. Dinning and H. M. Briggs, Am. J. Physiol., 153, 446, 1948.)

An object of the present invention is to provide a new source of usable nitrogen to supplement the protein feed for the microflora of Ruminantia. Yet another object is to provide from ammonium salts of organic acids, as sources of nitrogen, a supplemental feed in which the usable synthetic nitrogen ration of the animal may be increased and the potential hazards resulting from ammonia evolution minimized. Still another object is to provide a supplemental feed composition for cattle containing, as an essential ingredient thereof, certain ammonium salts of the organic acids. A further object is to provide ammonium acylates readily available for utilization by rumen microorganisms. Other objects and advantages of the invention will hereinafter appear.

In accord with the invention it has been found that ammonium salts of organic acids generally can be used as a source of nitrogen to supplement protein feed of Ruminantia with a minimum requirement for restricting the ingestion of the salt by the animal. While the said salts break down more slowly to provide nutrients for the rumen microorganisms in the digestion of roughages, and more particularly cellulose in its various forms, the break down rate to ammonia is considerably less than that from other synthetic nitrogen compounds such as urea, for example. Moreover, the salts of the invention improve nitrogen utilization and because of this fact lower the ammonia level. Furthermore, the carbon chain of these salts supply a portion of the metabolic needs of the rumen microflora, i.e. energy source units for amino acid and protein synthesis as well as units for fatty acid and fat synthesis.

Work with cattle and sheep, in order to determine the value of feeds generally, has been conducted until recently directly by feeding the animal. Within the past few years an in vitro rumen and technique for its use have been developed whereby the changes taking place in feeds, brought about by microorganisms, can be measured more readily and accurately. This technique involves the use of an apparatus in which the digestive processes of the animal are conducted and can be studied in vitro. By this means, various animal feeds are introduced into or withdrawn from the laboratory unit under carefully controlled conditions and the changes taking place studied critically and progressively during the consumption of the feed by the microorganisms.

The results obtained by use of the aforesaid transplanted rumen technique have been confirmed by actual feeding of animals. This technique has established, for example, that protein addition to the feed substantially increases the consumption of cellulose by the animals and that also an increase in usable nitrogen to supplement protein feeds likewise improves ability to consume cellulose. The aforesaid and other results were determined first by laboratory experiments working in vitro and were later established in vivo by direct feeding of animals.

The feed supplements of this invention are the ammonium salts of the organic acids which not only supply a source of biologically available nitrogen as a nutrient for rumen microflora but also give a limited evolution of ammonia during ingestion and also improve utilization of $NH_3$ nitrogen. The low ammonia evolution determined in vitro is an assurance that these feed supplements can be used with wide latitudes in the composition of feeds.

In the examples which follow and which illustrate preferred embodiments of the invention, parts are by weight unless otherwise indicated.

This procedure was used in carrying out the processes of the examples. Into an Erlenmeyer flask of approximately 1 liter capacity was introduced 9 grams of cellulose, 0.6 grams of molasses ash, 70 cc. of nutrient salt solution, 1 gram of glucose and 450 cc. of a rumen inoculum, the mixture being diluted to 900 cc. with distilled water.

The nutrient salt solution contained a mixture of metal salts of the following composition:

| | Gm. |
|---|---|
| Sodium phosphate, monobasic | 52.50 |
| Sodium bicarbonate | 52.50 |
| Ammonium sulfate | 37.50 |
| Potassium chloride | 7.50 |
| Sodium chloride | 7.50 |
| Magnesium sulfate | 2.25 |
| Calcium chloride | 0.75 |
| Ferrous sulfate | 0.15 |

Rumen inoculum was obtained from the first stomach of a fistulated steer which had been fed with a diet consisting of grain concentrate, alfalfa hay and salt mixture. The extracted rumen content was filtered through four thicknesses of cheese cloth or muslin of comparable porosity to remove solid matter, the liquid filtrate being employed as the rumen inoculum. During the removal and filtration of the rumen contents care was exercised to exclude air.

The Erlenmeyer flask was charged with 450 cc. of this rumen liquid to which was added 450 cc. of a distilled water suspension or solution of the aforementioned basal medium plus the nutrient to be evaluated. This flask was placed in a constant temperature water bath maintained at approximately 39° C. and carbon dioxide pumped through the charge in the flask to maintain anaerobic conditions.

At the end of the first 24 hours of bacterial digestion a sample was taken for analysis to determine ammonia, cellulose digestion and bacterial growth. After 24 hours digestion new nutrients in water were inoculated with half (450 cc.) of the previous day's fermentation and diluted to 900 ml. with water. The analyses and subculturing into new nutrients was repeated over a 4 day period.

In the examples which follow comparisons are made between ammonium salts and urea. These comparisons show the cellulose digestion as well as the ammonia evolution of the compositions examined compared with a blank composition containing only cellulose, molasses ash, nutrient salt solution and rumen inoculum.

*Example 1*

FLASK CONTENTS

|  | 1 | 2 | 3 | 4 | 5 |
|---|---|---|---|---|---|
| Cellulose, g | 9 | 9 | 9 | 9 | 9 |
| Molasses ash, g | 0.6 | 0.6 | 0.6 | 0.6 | 0.6 |
| Nutrient salt sol'n, ml | 70 | 70 | 70 | 70 | 70 |
| Dextrose, g | 1 | 1 | 1 | 1 | 1 |
| Starch, g | 1 | 0.4 | 1 | 1 | 1 |
| Urea, g | | 0.4 | | | |
| Ammonia formate, g | | | 0.837 | | |
| Ammonia succinate, g | | | | 1.016 | |
| Ammonia adipate, g | | | | | 1.197 |
| Rumen inoculum, ml | 450 | 450 | 450 | 450 | 450 |
| H₂O | | | dilute to 900 ml. | | |

HEIGHT OF NH₃ (MG.)

|  | 1 | 2 | 3 | 4 | 5 |
|---|---|---|---|---|---|
| At end of: | | | | | |
| 1st day | 18 | 119 | 115 | 103 | 121 |
| 2nd day | 3 | 134 | 126 | 73 | 151 |
| 3rd day | 2 | 127 | 118 | 80 | 163 |
| 4th day | 0 | 131 | 72 | 38 | 137 |
| Av | 6 | 128 | 108 | 74 | 143 |

CELLULOSE DIGESTION (PERCENT)

|  | 1 | 2 | 3 | 4 | 5 |
|---|---|---|---|---|---|
| 1st day | 43 | 72 | 68 | 65 | 66 |
| 2nd day | 6 | 49 | 48 | 55 | 45 |
| 3rd day | 0 | 441 | 41 | 45 | 39 |
| 4th day | 3 | 49 | 62 | 64 | 47 |
| Av | 13 | 53 | 55 | 57 | 49 |

*Example 2*

FLASK CONTENTS

|  | 1 | 2 | 3 | 4 |
|---|---|---|---|---|
| Cellulose, g | 9 | 9 | 9 | 9 |
| Molasses ash, g | 0.6 | 0.6 | 0.6 | 0.6 |
| Nutrient salt sol'n, ml | 70 | 70 | 70 | 70 |
| Dextrose, g | 1.8 | 1 | 1 | 1 |
| Starch, g | 1 | 1 | 1 | 1 |
| Urea, g | 0.4 | | 0.4 | 0.4 |
| Ammonium succinate, g | | 1.02 | | |
| Sodium succinate, g | | | 1.08 | |
| Succinic acid, g | | | | 0.81 |
| Rumen liquid, ml | 450 | 450 | 450 | 450 |
| H₂O | | dilute to 900 ml. | | |

HEIGHT OF NH₃ (MG.)

|  | 1 | 2 | 3 | 4 |
|---|---|---|---|---|
| At end of: | | | | |
| 1st day | 144 | 113 | 136 | 142 |
| 2nd day | 84 | 37 | 70 | 86 |
| 3rd day | 149 | 42 | 110 | 152 |
| 4th day | 130 | 96 | 138 | 77 |
| Av | 127 | 72 | 114 | 114 |

CELLULOSE DIGESTION (PERCENT)

|  | 1 | 2 | 3 | 4 |
|---|---|---|---|---|
| 1st day | 57 | 59 | 59 | 58 |
| 2nd day | 87 | 82 | 84 | 84 |
| 3rd day | 44 | 61 | 47 | 39 |
| 4th day | 55 | 35 | 43 | 60 |
| Av | 61 | 60 | 58 | 60 |

*Example 3*

FLASK CONTENTS

|  | 1 | 2 | 3 | 4 |
|---|---|---|---|---|
| Cellulose, g | 9 | 9 | 9 | 9 |
| Molasses ash, g | 0.6 | 0.6 | 0.6 | 0.6 |
| Nutrient salt sol'n, ml | 70 | 70 | 70 | 70 |
| Dextrose, g | 1 | 1.0 | 1 | 1 |
| Starch, g | 1 | 0.4 | 1 | 1 |
| Urea, g | | | | |
| Ammonium carbonate, g | | | 0.76 | |
| Ammonium lactate, g | 1 | 1 | 1 | 1.4 |
| Rumen liquid, ml | 450 | 450 | 450 | 450 |
| H₂O | | dilute to 900 ml. | | |

HEIGHT OF NH₃ (MG.)

|  | 1 | 2 | 3 | 4 |
|---|---|---|---|---|
| At end of: | | | | |
| 1st day | 36 | 184 | 208 | 164 |
| 2nd day | 11 | 103 | 125 | 84 |
| 3rd day | 4 | 117 | 150 | 57 |
| 4th day | 3 | 157 | 171 | 80 |
| Av | 14 | 140 | 164 | 96 |

CELLULOSE DIGESTION (PERCENT)

|  | 1 | 2 | 3 | 4 |
|---|---|---|---|---|
| 1st day | 62 | 68 | 69 | 71 |
| 2nd day | 26 | 89 | 91 | 98 |
| 3rd day | 6 | 66 | 54 | 82 |
| 4th day | 4 | 37 | 43 | 45 |
| Av | 25 | 65 | 64 | 74 |

In the above examples the nitrogen supplements were compared with a blank inoculum and with an inoculum containing urea in each example for, by and large, these examples were conducted on different days and the microflora content taken from the fistulated steer was found to vary slightly from day to day. The examples compare the ammonia utilization and the cellulose digestion for the inoculum with and without urea and for the ammonium salts examined.

In Example 1 ammonium formate, ammonium succinate and ammonium adipate treated inoculum are compared with an inoculum per se and with an inoculum containing urea, for ammonia utilization and for cellulose digestion. It will be noted that an average of 128 mg. of ammonia was obtained with the urea treated inoculum while the ammonium formate, ammonium succinate and ammonium adipate treated inoculum contained respectively an average for the four days of 108 mg., 34 mg., and 143 mg. of ammonia evolved. The cellulose digestion for urea treated and for the salt treated inoculum of this example are substantially the same.

In Example 2 ammonium succinate is compared with an inoculum containing urea. The latter on the fourth day averaged 127 mg. of ammonia evolved while that containing ammonium succinate averaged but 72 mg. The cellulose digestion for the urea and for the ammonium succinate treated inoculum was substantially identical. Example 2 also indicates that the ammonium succinate effect is unique for this compound and is not due to the effect of succinic acid or the succinate ion on ammonia utilization.

Example 3 compares ammonium lactate and urea treated inoculum with untreated inoculum. In accord with this example the ammonia evolved from the urea treated inoculum averaged 140 mg. for the four days while that containing ammonium lactate averaged but 96 mg. The cellulose digestion for the ammonium lactate treated inoculum was 74% while that for the urea treated inoculum was but 65%.

The ammonium salts of the organic acids that may be used in accord with the invention, as nitrogen supplements for feeding rumen microflora and through them aid in cellulose digestion for Ruminantia, include the ammonium salts of formic, acrylic, propionic, acrylic, malic, stearic, oleic, fumaric, glutaric, succinic, adipic, glycolic, citric, tartaric, gluconic, and lactic acids.

In the formulation of feeds for cattle and sheep, the ammonium salts of the organic acid can be used to supply from 5 to 90% of the nitrogen content of the protein requirements for the animal. This is a general rule that can be followed for complete rations for the production of protein concentrate mixtures or for the preparation of pelleted products. In the preparation of such formulated feeds, it is desirable that the synthetic nitrogen constituents thereof be preferably dry mixed with the other feed ingredients so that they can be evenly distributed throughout the feed. Any suitable mixture may be employed as, for example, a 14% protein feed can be made into an 18% feed composition by the addition of slightly more than 69.5 pounds of ammonium succinate per ton of feed. The usual type of feed composition is employed to provide the normal amount of carbohydrate content which may be supplied by wheat, oats, barley, corn, hominy, molasses and the like. These feeds may also contain oil meals and similar meals to supply natural proteins. For example, a typical 20% dairy ration for cattle may contain 300 lbs. of wheat bran, 310 lbs. of hominy feed, 200 lbs. of crimped oats, 300 lbs. of distillers dried grains, 175 lbs. of corn gluten feed, 400 lbs. of cocoanut oil meal, 10 lbs. of soybean oil meal, 150 lbs. of molasses, 52 lbs. of an ammonium succinate, 70 lbs. of brewers dried grains and 50 lbs. of minerals and salt.

Cattle are usually supplied with a diet of grass, hay and the like, augmented by a food concentrate such as that described in the last paragraph. These feed concentrates may contain from 10 to 50% protein, a small amount of minerals and the remainder mainly carbohydrate. The minerals may be added directly to the feed concentrate. When preparing the concentrate in this manner such minerals as, e.g., defluorinated phosphate rock, salt and the like may be used. Contrariwise, the minerals may be indirectly added with the carbohydrate and/or protein as a normal part of those ingredients. In preparing such feed concentrates it has been found that the salts hereinbefore described may constitute from 5 to 90% of the nitrogen content of the feed, the remainder of the nitrogen being provided by protein.

The invention is not limited to the specific compositions described, nor to their specific proportions for the rate of utilization and its efficiency, as will be appreciated by those skilled in the art, is determined in large measure by the availability of the nitrogen to the rumen microorganisms and as a consequence, the percentage ingestion of a given salt that can be used varies over a wide range in accordance with the nitrogen content of that feed supplement.

I claim:

1. A ruminant feed composition for feeding of rumen microflora containing carbohydrates, protein, and, as a supplementary source of nitrogen, ammonium succinate.

2. A ruminant feed composition containing carbohydrates, minerals, protein, and, as a supplementary source of nitrogen, ammonium succinate, the ammonium succinate supplying from 5 to 90% of the nitrogen content of the feed.

3. A ruminant feed composition containing minerals, from 10 to 50% protein, and the remainder mainly carbohydrate products, and ammonium succinate supplying from 5 to 90% of the nitrogen content of the feed.

References Cited in the file of this patent

UNITED STATES PATENTS 2,560,830     Turner _____ July 17, 1951

OTHER REFERENCES

Morgan et al.: Landwirtschaftliche Versuchs-Stationen 73 (1910), pp. 318–319.

Benesch: Nature, 147 (1941), pp. 531–4.